United States Patent
Fujino et al.

(10) Patent No.: US 8,069,474 B2
(45) Date of Patent: Nov. 29, 2011

(54) SOFTWARE-USAGE MANAGEMENT SYSTEM, SOFTWARE-USAGE MANAGEMENT METHOD, AND COMPUTER PRODUCT

(75) Inventors: Akio Fujino, Tokyo (JP); Kosei Takano, Tokyo (JP)

(73) Assignee: Fujitsu Limited, Kawasaki (JP)

( * ) Notice: Subject to any disclaimer, the term of this patent is extended or adjusted under 35 U.S.C. 154(b) by 1337 days.

(21) Appl. No.: 11/130,275

(22) Filed: May 17, 2005

(65) Prior Publication Data
US 2005/0209878 A1   Sep. 22, 2005

Related U.S. Application Data

(63) Continuation of application No. PCT/JP03/06013, filed on May 14, 2003.

(51) Int. Cl.
| | |
|---|---|
| G06F 7/04 | (2006.01) |
| G06F 15/16 | (2006.01) |
| G06F 17/30 | (2006.01) |
| H04L 29/06 | (2006.01) |

(52) U.S. Cl. .................. 726/7; 726/1; 726/21; 713/150
(58) Field of Classification Search .................. 726/1, 7
See application file for complete search history.

(56) References Cited

U.S. PATENT DOCUMENTS

| | | | |
|---|---|---|---|
| 6,256,737 B1 | 7/2001 | Bianco et al. | |
| 6,546,492 B1 * | 4/2003 | Walker et al. | 726/3 |
| 2002/0087489 A1 | 7/2002 | Iizuka | |
| 2002/0147778 A1 * | 10/2002 | Dutta | 709/206 |
| 2003/0014652 A1 | 1/2003 | Nakayama | |
| 2004/0015949 A1 * | 1/2004 | Taylor | 717/171 |

FOREIGN PATENT DOCUMENTS

| | | |
|---|---|---|
| JP | 2001-155033 | 6/2001 |
| JP | 2002-258970 | 9/2002 |
| JP | 2002-318707 | 10/2002 |
| JP | 2002-539538 | 11/2002 |
| JP | 2003-30063 | 1/2003 |
| JP | 2003-44441 | 2/2003 |
| JP | 2003044441 A * | 2/2003 |
| JP | 2003-91613 | 3/2003 |

OTHER PUBLICATIONS

English Translation of JP2003044441A.*
English Translation of JP2003044441A, Publication Data: Feb. 2003.*
Sugiyama, et al., "Bunsan Kankyo ni Okeru User Ninsho System", NTT R&D, Nippon Telegraph and Telephone Corp., Jan. 10, 1996, vol. 45, No. 1, pp. 67-72.
Tabuchi, "Network Computing ni Okeru Security Gijutsu", Fujitsu, Fujitsu Ltd., Mar. 10, 1997, vol. 48, No. 2, pp. 79-86.
Notice of Rejection from Japanese Patent Office for corresponding Japanese application 2004-571848; mailed Oct. 21, 2008.

* cited by examiner

*Primary Examiner* — Kim Vu
*Assistant Examiner* — Yogesh Paliwal
(74) *Attorney, Agent, or Firm* — Fujitsu Patent Center

(57) ABSTRACT

A software-usage management system that manages a usage of a software function by a client connected to a network includes a test-conducting unit that conducts a test relevant to a software function for a user of a client for which a specific software function is not available from a standpoint of security; and a usage allowing unit that allows a user who passed the test conducted by the test-conducting unit to use the specific software function.

8 Claims, 14 Drawing Sheets

FIG.3

| LICENSED SOFTWARE NUMBER | LICENSED SOFTWARE NAME | DOWNLOADABLE SOFTWARE FILE NAME RECEIVED FROM SOFTWARE VENDOR | ACTUAL DATA (INCLUDING INSTALLER) OF SOFTWARE |
|---|---|---|---|
| S0013478 | PROGRAM ENABLING ACCESS TO FILES WITH EXTENSION "exe" | fujiharas0013478xyz87456 | |
| ... | | | |

15a DOWNLOADABLE SOFTWARE FILE

FIG.4

TEST-PASS NOTIFICATION

DEAR CUSTOMER

YOU HAVE PASSED THE exe FILE IMPORT AUTHORIZING TEST (T02301).

THIS ENTITLES YOU TO IMPORT THE FUNCTION-ENHANCING SOFTWARE MENTIONED BELOW.

exe FILE IMPORT ENABLING PROGRAM

FIG.5

FUNCTION ENHANCING SOFTWARE REQUEST SCREEN

YOU MAY NOW REQUEST FOR THE FOLLOWING FUNCTION-ENHANCING SOFTWARE

PROGRAM NAME

SEND    exe FILE IMPORT ENABLING PROGRAM

TO REQUEST FOR THE SOFTWARE, CLICK THE 'SEND' BUTTON

FIG.6

| USER NAME | CLEARED TEST NUMBER | SOFTWARE NUMBER | DOWNLOADABLE SOFTWARE FILE NAME | USER PUBLIC ENCRYPTION KEY (1) |
|---|---|---|---|---|
| CUSTOMER | T02301 | S0013478 | fujiharas0013478xyz87456 | Xxxxxxx |
| ... | | | | |
| | | | | |

22b CUSTOMER DB

22c VENDOR DB

| SOFTWARE VENDOR NAME | SOFTWARE NUMBER USED BY SOFTWARE VENDOR | SOFTWARE VENDOR PUBLIC ENCRYPTION KEY |
|---|---|---|
| MAX MICRO | S0013478 | zzzzzzzzzzzz |
| MAX MICRO | S0036281 | |
| ⋮ | | |

FIG.8

22d TEST-SOFTWARE ASSOCIATION DB

| TEST NAME | TEST NUMBER | ASSOCIATED SOFTWARE NAME | SOFTWARE NUMBER |
|---|---|---|---|
| exe FILE IMPORT AUTHORIZING TEST | T02301 | exe FILE IMPORT ENABLING PROGRAM | S0013478 |
| Javascript ACCESS AUTHORIZING TEST | T03190 | Javascript EXECUTION ENABLING PROGRAM | S0036281 |
| : | : | : | : |

FIG.9

22e TEST QUESTIONS DB

| TEST NAME (TEST NUMBER) | QUESTION NUMBER | QUESTION | MULTIPLE OPTIONS | CORRECT ANSWER |
|---|---|---|---|---|
| exe FILE IMPORT AUTHORIZING TEST(T02301) | 1 | WHAT IS AN exe FILE? | 1)CLICKING ON AN exe FILE⋯.. <br>2) <br>3) <br>4) | 1 |
| | 2 | | | |
| | 3 | | | |
| | ⋮ | | | |
| | ⋮ | | | |
| Javascript ACCESS AUTHORIZING TEST(T03190) | | | | |
| ⋯ | | | | |

FIG.10

| USER NAME | SOFTWARE NUMBER LICENSED TO USER | DOWNLOADABLE SOFTWARE FILE NAME FOR USER | USER PUBLIC ENCRYPTION KEY (2) |
|---|---|---|---|
| CUSTOMER | S0013478 | fujiharas0013478xyz87456 | yyyyyyyy |
| ... | | | |

32a CUSTOMER DB

US 8,069,474 B2

SOFTWARE-USAGE MANAGEMENT SYSTEM, SOFTWARE-USAGE MANAGEMENT METHOD, AND COMPUTER PRODUCT

This application is a continuing application, filed under 35 U.S.C. §111(a), of International Application PCT/JP2003/006013, filed May 14, 2003, incorporated by reference herein.

BACKGROUND OF THE INVENTION

1) Field of the Invention

The present invention relates to a technology for managing a usage of software functions by a client connected to a network, and ensuring a network security.

2) Description of the Related Art

Internet has always been plagued by hacker menace involving hackers invading other's computers using computer technology and wreaking havoc. Various security measures have been proposed to counter these destructive forces. One of such security measures is disclosed in Japanese Patent Laid-Open Publication No. 2002-318707, proposing a system for releasing on the Internet patches for software that can potentially cause security breach, tailor-made for each software manufacturer.

However, most of the users (of personal computers) connecting to the Internet do not have enough knowledge regarding the functions of the software used. Consequently, most fail to get the patches provided by the systems such as the one disclosed in Japanese Patent Laid-Open Publication No. 2002-318707, thus making their computers vulnerable to attack by ill-intentioned users. Not only are such computers exposed to attack by hackers, they also unintentionally damage the computers of other unsuspecting users. To give an analogy, the Internet is like a highway where a large number of vehicles driven by unlicensed drivers are plying.

Thus, it has become imperative to somehow make the Internet a secure place where preferably only licensed drivers ply.

SUMMARY OF THE INVENTION

It is an object of the present invention to solve at least the above problems in the conventional technology.

A software-usage management system according to one aspect of the present invention, which manages a usage of a software function by a client connected to a network, includes a test-conducting unit that conducts a test relevant to a software function for a user of a client for which a specific software function is not available from a standpoint of security; and a usage allowing unit that allows a user who passed the test conducted by the test-conducting unit to use the specific software function.

A software-usage management method according to another aspect of the present invention, which is for managing a usage of a software function by a client connected to a network, includes conducting a test relevant to a software function for a user of a client for which a specific software function is not available from a standpoint of security; and allowing a user who passed the test conducted by the test-conducting unit to use the specific software function.

A computer-readable recording medium according to still another aspect of the present invention stores a software-usage management program for managing a usage of a software function by a client connected to a network. The software-usage management program makes a computer execute conducting a test relevant to a software function for a user of a client for which a specific software function is not available from a standpoint of security; and allowing a user who passed the test conducted by the test-conducting unit to use the specific software function.

The other objects, features, and advantages of the present invention are specifically set forth in or will become apparent from the following detailed description of the invention when read in conjunction with the accompanying drawings.

BRIEF DESCRIPTION OF THE DRAWINGS

FIG. 3 is a table for illustrating an example of a software download file;

FIG. 4 is a schematic of an example of a screen displayed on a client;

FIG. 5 is a schematic of another example of a screen displayed on a client;

FIG. 6 is a table for illustrating an example of a customer DB;

FIG. 8 is a table for illustrating an example of a test-software association DB;

FIG. 9 is a table for illustrating an example of a test-question DB;

FIG. 10 is a table for illustrating another example of the customer DB;

DETAILED DESCRIPTION

Exemplary embodiments of the present invention are explained in detail below with reference to the accompanying drawings. An overview and features of a software-usage management system according to an embodiment of the present invention will be explained first, followed by an explanation of the configuration of the devices included in the software-usage management system, the process flow of the software-usage management system, and finally, the modifications according to another embodiment of the present invention.

Figure 1:
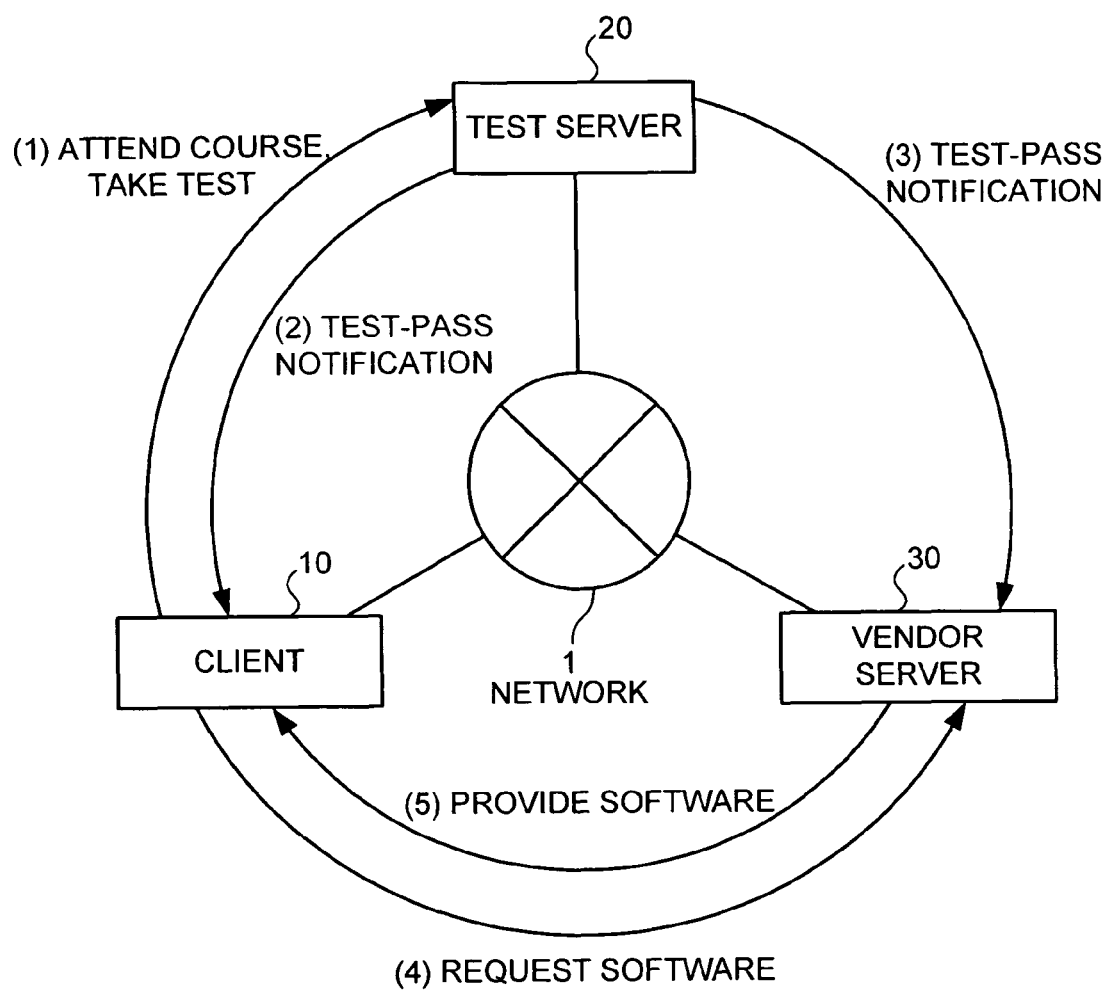
FIG. 1 is a schematic for illustrating an overall structure of a software-usage management system according to an embodiment of the present invention.

FIG. 1 is a schematic for illustrating an overall structure of a software-usage management system according to the embodiment. As shown in FIG. 1, the software-usage management system includes a client 10 such as a personal computer owned by a user, a test server 20 run by test-conducting facilities to conduct software-related tests, a vendor server 30 run by a software vendor, all of which are communicably interconnected via a network 1 such as the Internet.

The software-usage management system essentially manages the access of the software functions by the client 10. At the time of purchase of the client 10, certain software functions are not made available (because they are not yet installed into the client 10) to the user from security standpoint. The 'software functions' that are not made available to the user from security standpoint may include any software function that has a high possibility of causing a security breach, namely, receiving .exe files, receiving e-mail with attachment, mailbox function, mailer address book, office suite macro functions, running a Java script, etc.

The user of the client 10 accesses the test server 20, attends a course concerning the software functions such as those mentioned above, and takes a test on the use of the relevant software functions (see (1) of FIG. 1). The term 'course' in the present embodiment shall mean a learning course for acquiring knowledge regarding the relevant software function, and 'test' shall refer to the test to determine whether the candidate can use the relevant software function by implementing appropriate security measures so as not fall victim to a hacker.

If the user succeeds in the test, the test server 20 sends both to the client 10 and the vendor server 30 (see (2) and (3) of FIG. 1) an identification data (a downloadable software file name) indicating the software function passed by the user along with a test-pass notification (see FIG. 4). The term 'downloadable software file name' in the present embodiment refers to the information that uniquely distinguishes the software function (that is, the file containing the actual data of the software function) from among all the data sent over the network 1 from the vendor server 30 to the client 10.

Upon receiving the test-pass notification from the test server 20, the user accesses the vendor server 30, and through the screen shown in FIG. 5, makes a request for an install (installation) of the software function (see (4) of FIG. 1) relevant to the test passed. Upon receiving the request from the user, the vendor server 30 sends the downloadable software file name followed by the software function file requested by the user (see (5) of FIG. 1). The client 10 thus installs the software function provided by the vendor server 30.

Thus, the user of the client 10 in which certain software functions are not available is made to take a test on the use of those software functions, and the relevant software functions are made available to the user subject to the user passing the test. In other words, by making the user take and pass the test on the software functions that can potentially cause security breach (and not allowing access to the software functions to users whose knowledge regarding such software function is not adequate), vulnerability of the client 10 to attack by a hacker can be prevented, thus ensuring network security.

Furthermore, the software functions that can potentially cause security breach are installed by the client 10 for the first time only after the user passes the test. Consequently, the possibility of the user unwittingly using the software function is eliminated, thus making it safe even for a novice to use the client 10 without jeopardizing the security.

Apart from the aforementioned features, the software-usage management system has an additional feature in that the client 10 is denied permission to send or receive data other than the test format using the network 1, with the exception of the software function data sent by the vendor server 30 (that is, receiving files attached to e-mail, running Java script, etc. are prohibited).

Thus, prior to sending of the actual data, the vendor server 30 sends to the client 10 a notification in the form of text data (this corresponds to the transfer of the 'downloadable software file name' from the vendor server 30 to the client 10) indicating that the actual data is being sent. In other words, the software-usage management system allows the transfer, over the network, of only the software function for which the user has passed the test, thus convincingly eliminating the possibility of any breach of security due to the user receiving any irrelevant non-text format data.

Furthermore, the actual data received from the vendor server 30 is installed in the client 10 only when the 'downloadable software file name' received by the client 10 from the test server 20 upon passing the test and the 'downloadable software file name' received by the client 10 from the vendor server 30 when installing the software function. In other words, by confirming that the software function received from the vendor server 30 is relevant to the test passed by the user, security breach due to the client 10 installing any software function not relevant to the test passed by the user is prevented.

Moreover, the 'downloadable software file name' of both the test server 20 and the vendor server 30 are encrypted by public encryption keys and then sent to the client 10, and the client 10 decrypts these and determines whether the 'downloadable software file name' received from the test server 20 and the vendor server 30 are the same. In other words, it has been made difficult for a hacker to steal the authentication data, thereby preventing any possibility of the client 10 installing a counterfeit software function. The vendor public encryption key is used for encrypting the 'downloadable software file name' notified by the test server 20 to the vendor server 30.

Furthermore, the test server 20 and the vendor server 30 use distinctly different public encryption keys to encrypt the 'downloadable software file name' (for instance, the test server 20 uses the public encryption key (1) and the vendor server 30 uses the public encryption key (2), consequently, making it even more difficult for a hacker to decipher the downloadable software file name.

Moreover, the test is conducted by a facility—the test server 20—that is independent from the vendor. If the vendor were to conduct the test, there is a possibility that the test may be made easy to pass so that the vendor benefits. Thus, security is ensured by making the test count.

It is preferable that the test-conducting facilities make the test free and charge a fee for learning (training). In other words, by making the test demanding and thus inducing users to take up learning, the test-conducting facilities can generally spread awareness in the society, thus making it safe. However, while the test-conducting facilities stands to gain in this way, for the vendors it may not be a profitable proposition. Therefore, a higher facility distinct from the test-conducting facilities needs to be appointed that can establish a balance between the degree of difficulty of the test and the software that can be purchased upon passing that test.

Figure 2:
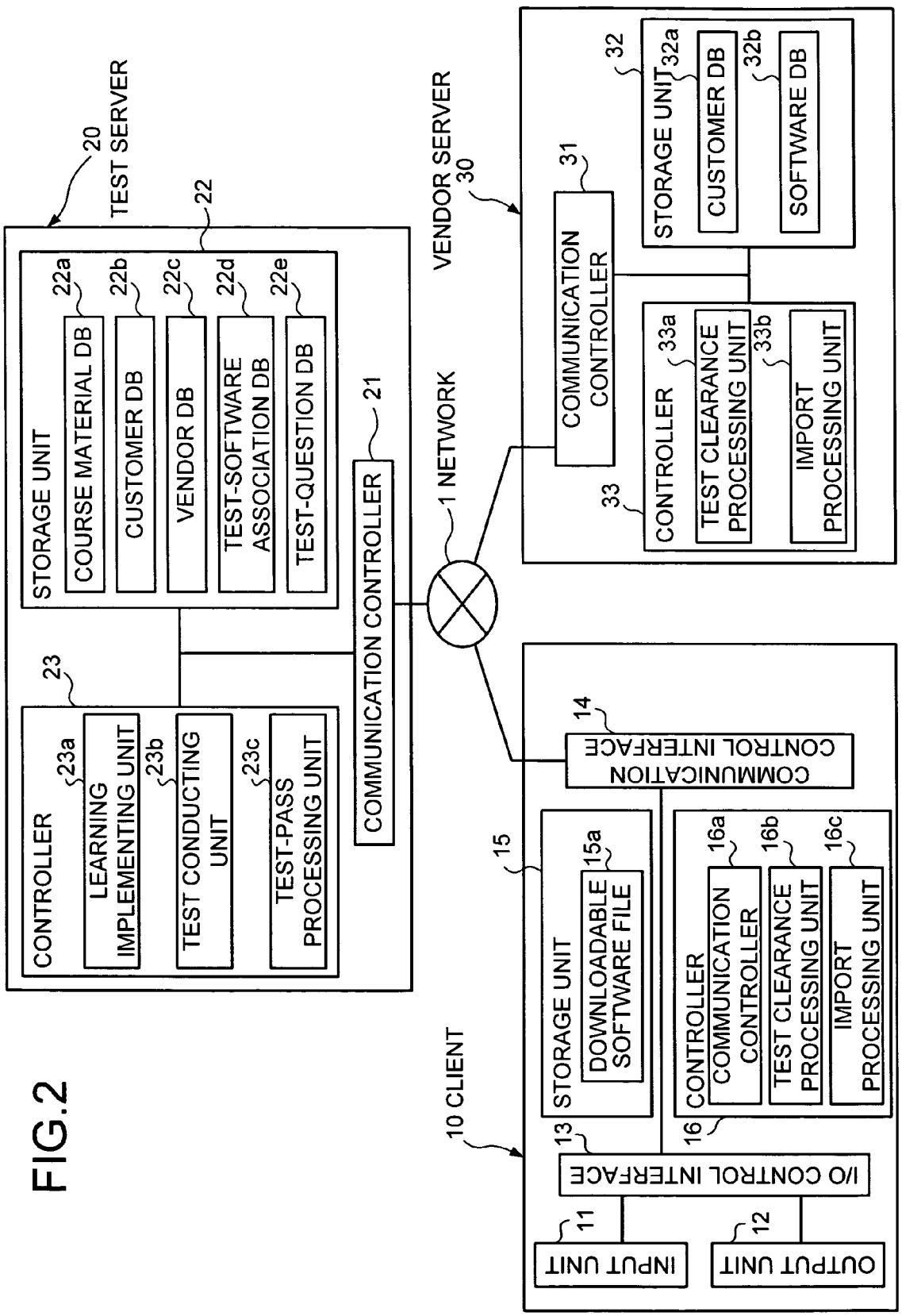
FIG. 2 is a block diagram of the software-usage management system.
Figure 7:
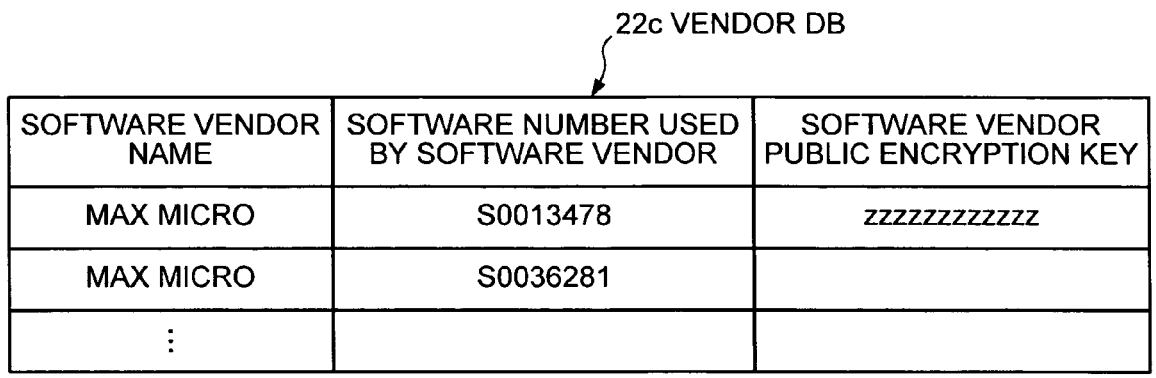
FIG. 7 is a table for illustrating an example of a vendor DB.

The configuration of the client 10 of the software-usage management system shown in FIG. 1 is explained with reference to FIGS. 2 and 3 to 5. As shown in FIG. 2, the client 10 includes an input unit 11, an output unit 12, an I/O control interface 13, a communication control interface 14, a storage unit 15, and a controller 16.

The input unit 11 is a means by which various data are input and consists of a keyboard and a mouse. The input unit 11 accepts from the user the input of answers to the test questions of the test server 20. The output unit 12 is a means by which various data are output and consists of a monitor, speakers, etc. The output unit displays, as shown in FIG. 4, the test-pass notification, or as shown in FIG. 5, a request screen for version upgradation.

The input/output control interface 13 is a means that controls the input and output of the input unit 11 and the output unit 12, respectively. The communication control interface 14 controls the communication related to various data exchanged by the client 10 with the test server 20 and the vendor server 30.

The storage unit 15 is a storage means (memory means) that stores data and programs necessary for different processes of the controller 16. Particularly, closely associated with the present invention, the storage unit 15 functionally conceptually includes a downloadable software file 15a in which all the data pertaining to the software for which the user has passed the test and is now licensed to use. As shown in FIG. 3, the downloadable software file 15a includes associated with the licensed software number, the licensed software name, the downloadable software file name received from the vendor server 30 (that is, the downloadable software file name received from the test server 20 upon passing the test), the actual data of the software received from the vendor server 30 (including the so-called installer), etc.

The controller 16 has an internal memory for storing control programs such as the Operating System (OS), programs and the necessary data that regulate various processes, and performs various processes by means of these programs and data. Particularly, closely associated with the present invention, the controller 16 functionally conceptually includes a communication controller 16a, a test-pass processing unit 16b, and an install processing unit 16c.

The communication controller 16a controls communication in such a way that no data other than that in text format is allowed to be sent or received over the network. In other words, if the client 10 has Windows (Registered trademark) as its operating system, and if the user is a novice, apart from the two exceptions mentioned in the following paragraphs, exchange of data of any format except that with the extension 'txt' over the network 1 must be denied from security standpoint. Therefore, the client 10 is initially provided with a software that protects the client 10 by accepting only text messages (and rejecting any mail with an attachment).

The two aforementioned exceptions are the binary code of the software included in the downloadable software file name and the encryption data included in the public encryption key required for user authentication. In other words, to install the software, the client 10 needs to receive the binary code (actual data) of the software from the vendor server 30. Prior to receiving the binary code, when the client 10 receives from the vendor server 30 the downloadable software file name, the communication controller 16a enables the client 10 to receive the binary code (actual data) by suppressing the rejection function.

Since user authentication becomes imperative when the user exchanges mail with the test server 20 and the vendor server 30, the client 10 must have installed thereon a software that implements public encryption key required by the user authentication protocol and a software for sending the public encryption key over the network 1. However, as a policy, the communication controller 16a implements an exceptional process by exerting control in such a way that only a decryption software is allowed to initially access the encryption data (binary data) and the binary data is then passed on to the necessary software only if found to be a relevant data upon extraction.

Since running Java script is disabled and communication is allowed only in the form of text data in the client 10 (by data monitoring carried out by the client 10), mail exchange between the client 10 with the test server 20 and the vendor server 30 are text-based (the client 10 however is provided with the function that allows interpretation of files in HTML format). Moreover, since the communication controller 16a disallows sending and receiving any data not in a text format, the downloadable software file name that is sent by the test server 20 after the user passes the test or the downloadable software file name that is sent by the vendor server 30 when the software is installed are encrypted as character data that can take the extension 'txt'. The range of software functions disallowed by the communication controller 16a narrows as the user takes and passes test after test, allowing more and more types of data to be sent and received by the client 10.

To return to the description of the controller 16, the test-pass processing unit 16b carries out processes associated with test-pass. The test-pass processing unit 16b carries out registration of the downloadable software file 15a having the software number and the software name included in the test-pass notification, and decryption and registration of the downloadable software file name included in the test-pass notification.

The install processing unit 16c carries out processes associated with the install of the software relevant to the test passed. The installation processing unit 16c requests the vendor server 30 for a software, decrypts the downloadable software file name received from the vendor server 30, verifies whether the software function received from the vendor server 30 is the same for which test was passed, registers of the downloadable software file 15a of the software function (actual data), installs of the software function, etc.

The client 10 can be realized by providing the functions of each of the aforementioned parts in a familiar personal computer or a workstation, home video game machine, internet TV, etc., or in a portable communication terminal such as a personal digital assistant (PDA), mobile phone, or personal handyphone system (PHS), etc.

The configuration of the test server 20 of the software-usage management system shown in FIG. 1 is explained with reference to FIGS. 2 and 6 to 9. As shown in FIG. 2, the test server 20 includes a communication control interface 21 that controls the communication related to various data exchanged by the test server 20 with the client 10 and the vendor server 30, a storage unit 22 explained below, and a controller 23.

The storage unit 22 is a storage means that stores various data (for example, Web data that is sent to and displayed on the client 10) and programs required by the controller 23 to carry out various processes. Particularly, closely associated with the present invention, the storage unit 22 functionally conceptually includes a course material DB 22a, a customer DB 22b, a vendor DB 22c, a test-software association DB 22d, and a test-question DB 22e.

The course material DB 22a stores various data pertaining to courses conducted for the user by the test server 20. To be specific, the course material DB 22a consists of course contents for various software (in the form of mail data or Web data to be sent to the client 10) that the user must gain knowledge in as a precondition to installing it on the client 10.

The customer DB 22b is a means that stores information pertaining to the users (customers) who have taken the various tests offered by the test server 20. To explain more specifically with reference to FIG. 6, the customer DB 22b stores in a correlated form the name of the user who has passed a test, a passed test number that uniquely identifies the test passed by the user, the software number of the software function that the user has procured license for by passing the test, the downloadable software file name, and the user public encryption key (1), etc.

The vendor DB 22c is a means that stores information pertaining to the vendors who have associated themselves with the test-conducting facilities. The vendor DB 22c stores in a correlated form the software vendor name, the software number of the software function sold by the vendor, vendor public encryption key, etc.

The test-software association DB 22d is a means that stores the association between the tests conducted by the test server 20 and the software functions offered by the vendor server 30. The test-software association DB 22d stores in a correlated form the name of the test conducted by the test server 20, the test number, the software name, and the software number of the software granted license to upon passing the tests.

The test-question DB 22e is a means that stores information pertaining to the tests conducted by the test server 20. The test-question DB 22e stores in a correlated form the names of the tests conducted by the test server 20 and the contents of the test questions (question number, question, multiple options, correct answer, etc.).

The controller 23 has an internal memory for storing control programs such as the Operating System (OS), programs (such as customer authentication program, etc.) and the necessary data that regulate various processes, and performs various processes by means of these programs and data. Particularly, closely associated with the present invention, the controller 23 functionally conceptually includes a learning implementing unit 23a, a test conducting unit 23b, and a test-pass processing unit 23c.

The learning implementing unit 23a carries out processes pertaining to learning implementation. To be specific, the learning implementing unit 23a reads from the course material DB 22a the lessons corresponding to the request made by the customer, and implements learning by sending e-mail or Web data to the client 10 of the customer, imparting e-Learning.

The test conducting unit 23b carries out processes pertaining to test conduction. To be specific, the test conducting unit 23b reads from the test-question DB 22e the test questions corresponding to the request made by the customer, and conducts tests by sending the test questions by e-mail or Web data to the client 10 of the customer, as well as carries out the evaluation of the test.

The test-pass processing unit 23c carries out processes pertaining to test-pass. The processes pertaining to test-pass, described in detail later with reference to FIG. 12, include processes like registering license information in the customer DB 22b, issuing (setting), and registering the downloadable software file name, notifying test-pass to the client 10 and the vendor server 30, etc.

The test server 20 can be realized by providing the functions of each of the aforementioned parts in a information processing devices such as the familiar personal computer or a workstation, personal handyphone system (PHS), mobile terminal, portable communication terminal, personal digital assistant (PDA), etc.

Figure 11:
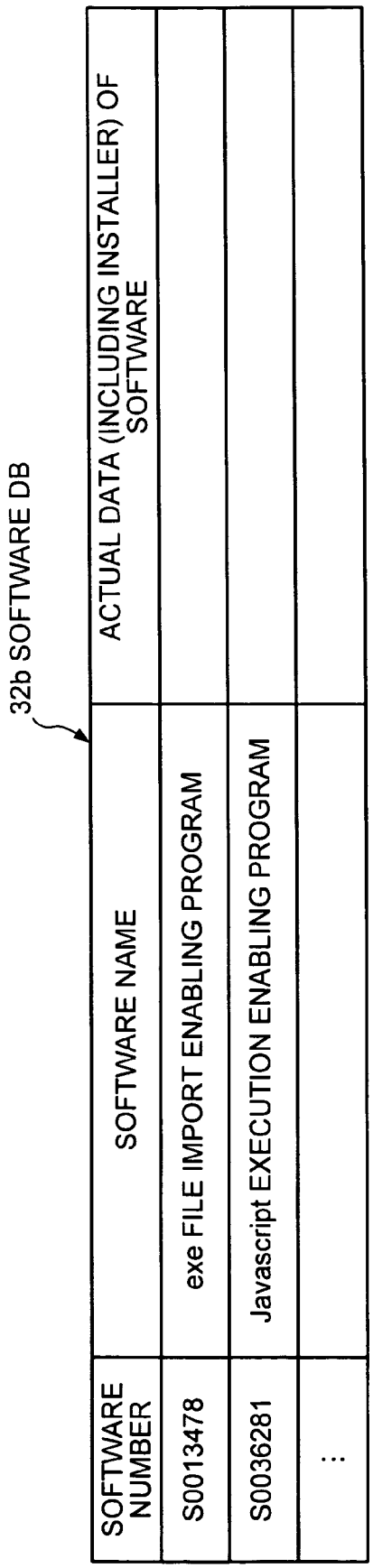
FIG. 11 is a table for illustrating an example of a software DB.

The vendor server 30 shown in the software-usage management system shown in FIG. 1 is explained next with reference to FIGS. 2, 10, and 11. As shown in FIG. 2, the vendor server 30 includes a communication control interface 31 that controls the communication related to various data exchanged by the vendor server 30 with the client 10 and the test server 20, a storage unit 32 explained below, and a controller 33.

The storage unit 32 is a storage means that stores various data (for example, Web data that is sent to and displayed on the client 10) and programs required by the controller 33 to carry out various processes. Particularly, closely associated with the present invention, the storage unit 22 functionally conceptually includes a customer DB 32a and a software DB 32b.

The customer DB 32a is a means that stores information pertaining to the users (customers) who have taken the various tests offered by the test server 20. The customer 32a stores in a correlated form the name of the user who has passed a test, the software number of the software function that the user has procured license for by passing the test, the downloadable software file name, and the user public encryption key (2), etc.

The software DB 32b is a means that stores various data pertaining to the software provided by the vendor server 30. As shown in FIG. 11, the software DB 32b stores in a correlated form the software number of the software function, the software name, and the actual data (including the installer) of the software function.

The controller 33 of the vender server 30 includes an internal memory for storing control programs such as the Operating System (OS), programs and the necessary data that regulate various processes, and performs various processes by means of these programs and data. Particularly, closely associated with the present invention, the controller 33 functionally conceptually includes a test-pass processing unit 33a and an install processing unit 33b.

The test-pass processing unit 33a carries out processes pertaining to test-pass. The processes pertaining to test-pass, described in greater detail later with reference to FIG. 12, include processes like registering in the customer DB 32a, the user name, software number included in the test-pass notification received from the test server 20, decrypting and registering the downloadable software file name included in the test-pass notification, etc.

The install processing unit 33b carries out processes pertaining to the install of relevant software corresponding to the test passed. The processes pertaining to software installation, described in greater detail later with reference to FIG. 13, include processes like authentication of software request from the user (that is, authenticating that the user has passed the test and has procured the license for the software), encryption of the downloadable software file name, sending the encrypted downloadable software file name and the software function (actual data), etc.

The vendor server 30 can also be realized by providing the functions of each of the aforementioned parts in a information processing devices such as the familiar personal computer or a workstation, personal handyphone system (PHS), mobile terminal, portable communication terminal, personal digital assistant (PDA), etc.

Figure 12:
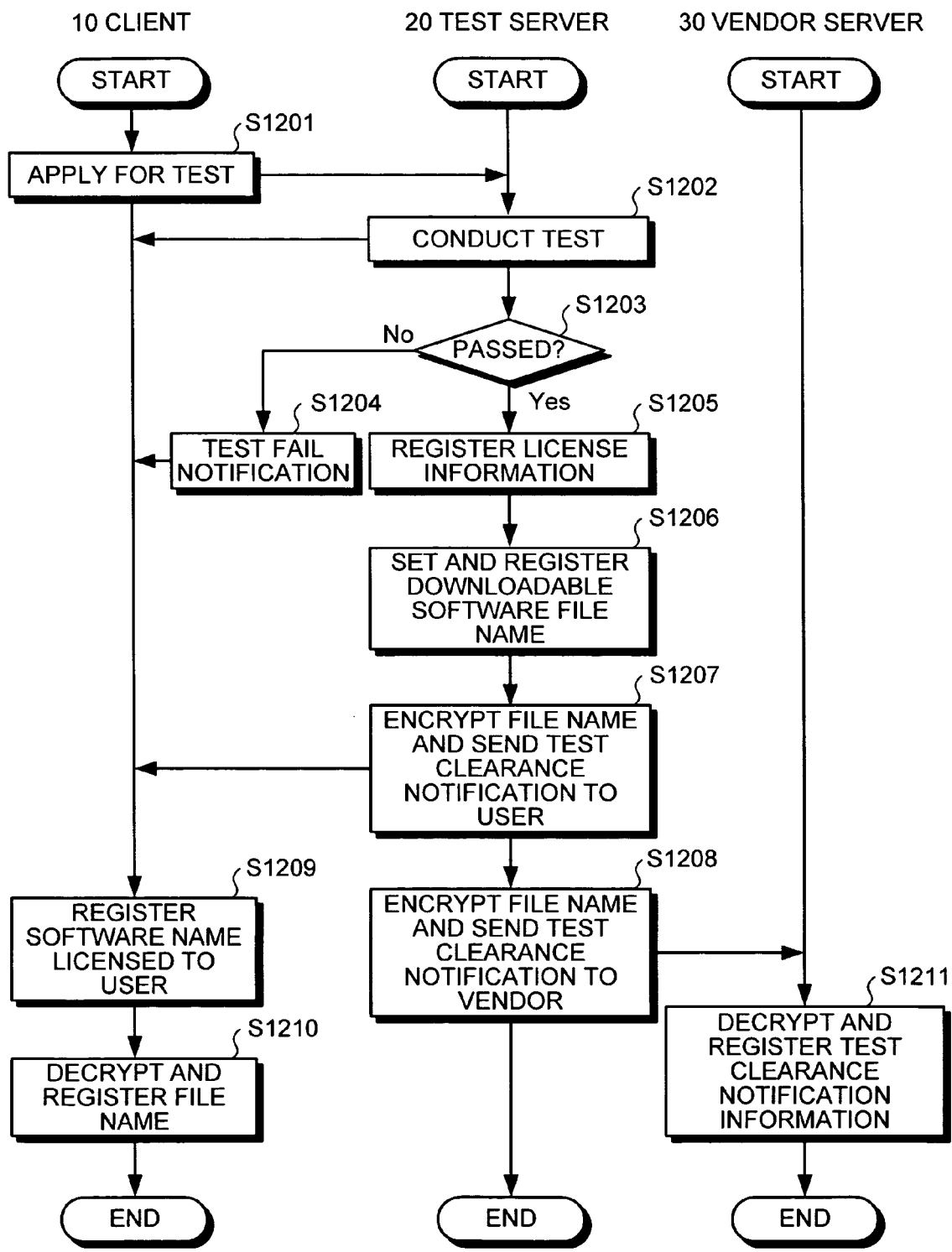
FIG. 12 is a flowchart of a process pertaining to a test.

FIG. 12 is a flowchart of the processes pertaining to a test in the software-usage management system. The user of the client 10 in which certain software functions are not yet available from security standpoint accesses the test server 20 from the client 10 and applies for a test relevant to the software function that the user desires to install to the client 10 (step S1201). In response to the application, the test server 20 conducts a test for the user on the use of the requested software function through the client 10 (step S1202).

If the user fails to pass the test ("No" at step S1203), the software function remains unavailable to the client and the test server 20 sends a test fail notification to the client 10 (step S1204). The user must study to pass the test. The may undertake the study independently. Alternatively, the user may enroll with the test server 20 (and do e-Learning).

If the user passes the test ("Yes" at step S1203), the test server 20 registers the passed test number and the software number of the software the test entitles the user to against the against the user name in the customer DB 22b (step S1205). The test server 20 also randomly issues (sets) a downloadable software file name and registers the downloadable software file name also in the customer DB 22b (step S1206).

The test server 20 encrypts the downloadable software file name using the user public encryption key (1) (see FIG. 6), includes the encrypted file name in the test-pass notification (see FIG. 4) and sends the test-pass notification to the client 10 of the user (step S1207). The test server 20 encrypts the downloadable software file name using the vendor public encryption key (see FIG. 7), includes the encrypted file name in the test-pass notification, and sends the pass notification to the vendor server 30 (step S1208). The test-pass notification specifies the software function corresponding to the test passed, retrieved from the test-software association DB 22d.

Upon receiving the test-pass notification, the client 10 registers in the downloadable software file 15a the software number and the software name of the software corresponding to the test passed (step S1209). The client 10 also decrypts and registers the encrypted downloadable software file name (step S1210). Similarly, upon receiving the test-pass notification, the vendor server 30 also registers the licensed software number included in the test-pass notification in the corresponding the customer DB 32a, as well as decrypts and registers the encrypted downloadable software file name in the customer DB 32a (step S1211).

Figure 13:
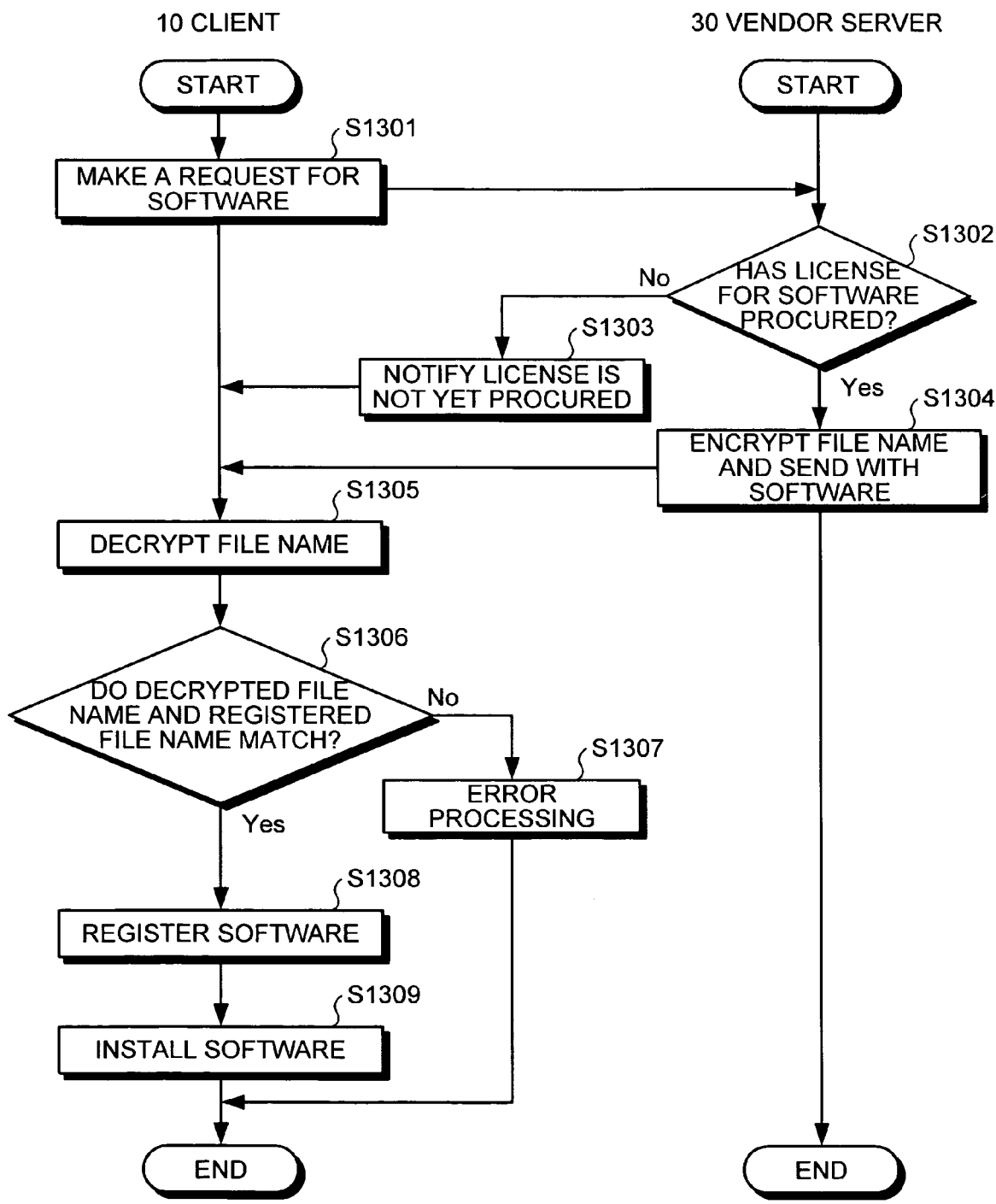
FIG. 13 is a flowchart of a process pertaining to a software install.

FIG. 13 is a flowchart of the processes pertaining to the software install in the software-usage management system. The user, upon passing the test, accesses the vendor server 30 from the client 10 (see FIG. 5) and makes a request for an install (download/installation) of the software function passing the test entitles the user to (step S1301). In response to the request, the vendor server 30 verifies whether the requesting user has indeed passed the test and has been issued a license (step S1302). That is, the vendor server 30 confirms whether the downloadable software file name corresponding to the test passed is registered in the customer DB 32a.

If no license has been issued ("No" at step S1302), the vendor server 30 notifies the client 10 that no license has been issued (step S1303). If, on the contrary, the license is issued ("Yes" at step S1302), the vendor server 30 encrypts the downloadable software file name registered in the customer DB 32a using the user public encryption key (2) and sends the encrypted file name along with the actual data of the relevant software function corresponding to the test passed (see the software DB 32b shown in FIG. 11) (step S1304). The software function to be downloaded/installed can be either free or fare-paying.

Upon receiving the encrypted downloadable software file name and the actual data of the software function, the client 10 decrypts the downloadable software file name (step S1305) and verifies whether the decrypted downloadable software file name received from the vendor server 30 and the downloadable software file name registered in the downloadable software file 15a are the same (step S1306). The exceptional process of receiving the downloadable software file name from the vendor server 30 allows the client 10 to receive the actual data, provided the data is text-based.

If the two downloadable software file names do not match ("No" at step S1306), the client 10 does not recognize the received software function as the right one and stops the software install process (step S1307). On the other hand, if the two downloadable software file names match ("Yes" in step S1307), the client 10 registers the received actual data of the software function in the downloadable software file 15a (step S1308), and proceeds to install the software function (step S1309). In other words, the client 10 replaces the existing low-level software function with the newly procured software function.

In the eventuality of the received software not being the right software or a failed installation, it would be preferable to have the client 10 request the test server 20 to issue a new downloadable software file name again rather than request the vendor server 30 to resend the downloadable software file name and the actual data.

The present invention, without limiting the appended claims, may embody all modifications and alternative constructions that may occur to one skilled in the art which may fairly fall within the basic teaching herein set forth. Other embodiments of the present invention are explained next under the following categories: lifting software access restriction; management by servers; system configuration, etc.; and program According to the present embodiment, the software function that can potentially cause security breach is installed for the first time after the user takes and passes the test relevant to the software function. However, the client 10 may be allowed to install the software function with access restriction that limit the access to the software function unless the user takes and passes the test relevant to the software function. Upon passing the test, the vendor server 30 may send to the client 10 to lift the access restriction. In other words, security may be preserved even if the user is a novice, by imposing a restriction on the access of an already installed software function until the user passes the test relevant to the software function.

According to the present embodiment, conducting tests and lifting restrictions on software access were carried out by two independent facilities, namely the test server 20 and the vendor server 30, respectively. However, the two functions of conducting tests and lifting restrictions on software used may be carried out by a single facility. Furthermore, in the present invention, the test server 20 imparts lessons as well as conducts tests. However, a separate facility may be assigned to impart lessons. Thus, by making the tests neutral and benefit the society at large, the tests are made more significant.

All the automatic processes explained in the present embodiment can be, entirely or in part, carried out manually. Similarly, all the manual processes explained in the present embodiment can be entirely or in part carried out automatically by a known method. The sequence of processes, the sequence of controls, specific names, and data including various parameters can be changed as required unless otherwise specified.

The constituent elements of the devices illustrated are merely conceptual and may not necessarily physically resemble the structures shown in the drawings. In other words, the device need not necessarily have the structure that is illustrated. The device as a whole or in parts can be broken down or integrated either functionally or physically in accordance with the load or how the device is to be used. Further, the process functions performed by the apparatus are entirely or partially realized by the CPU or a program executed by the CPU or by a hardware using wired logic.

The processes described in the present embodiment can be realized by making a computer system such as a personal computer or a workstation to execute a ready program.

Figure 14:
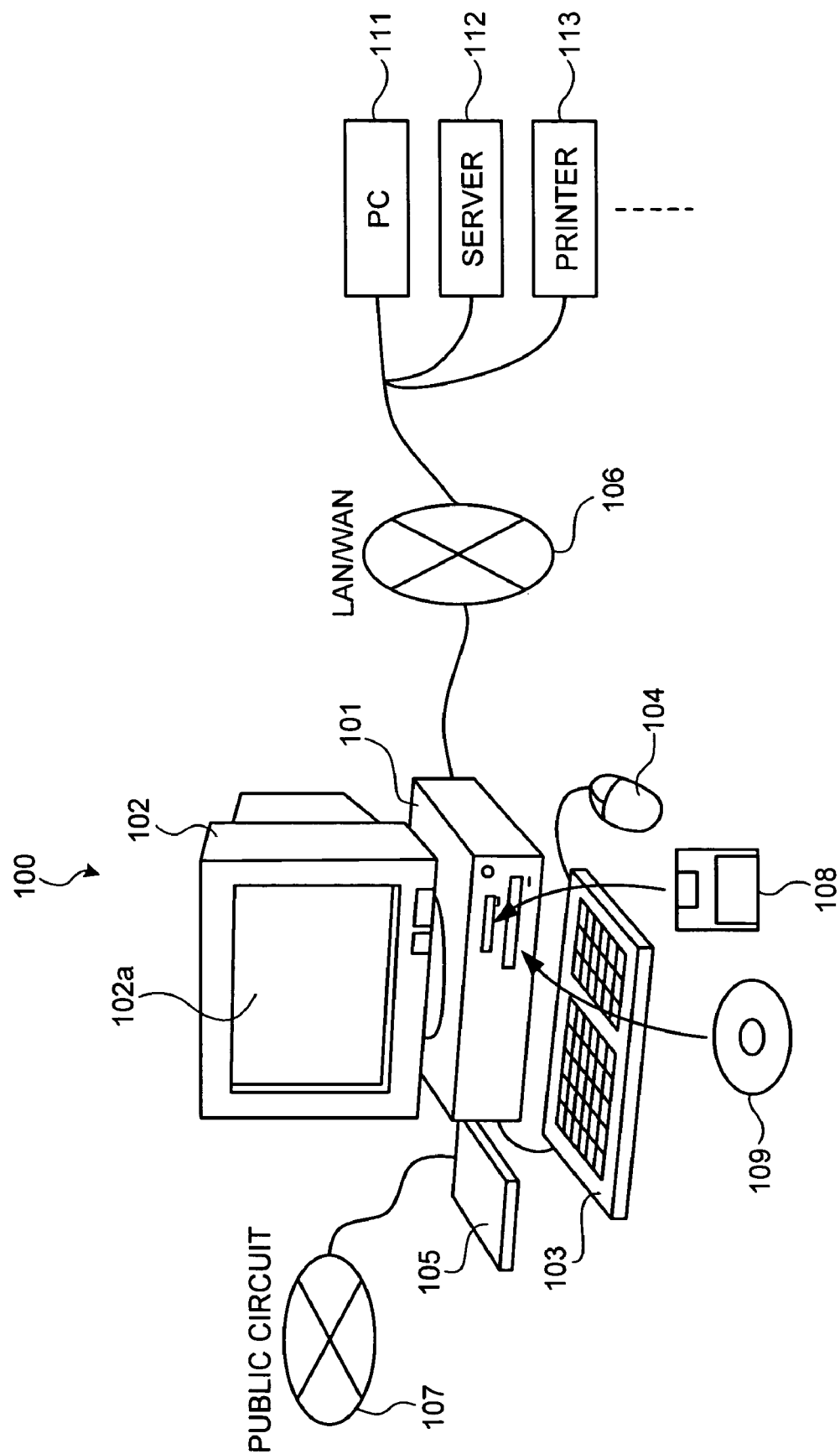
FIG. 14 is a schematic of a computer system according to another embodiment of the present invention.
Figure 15:
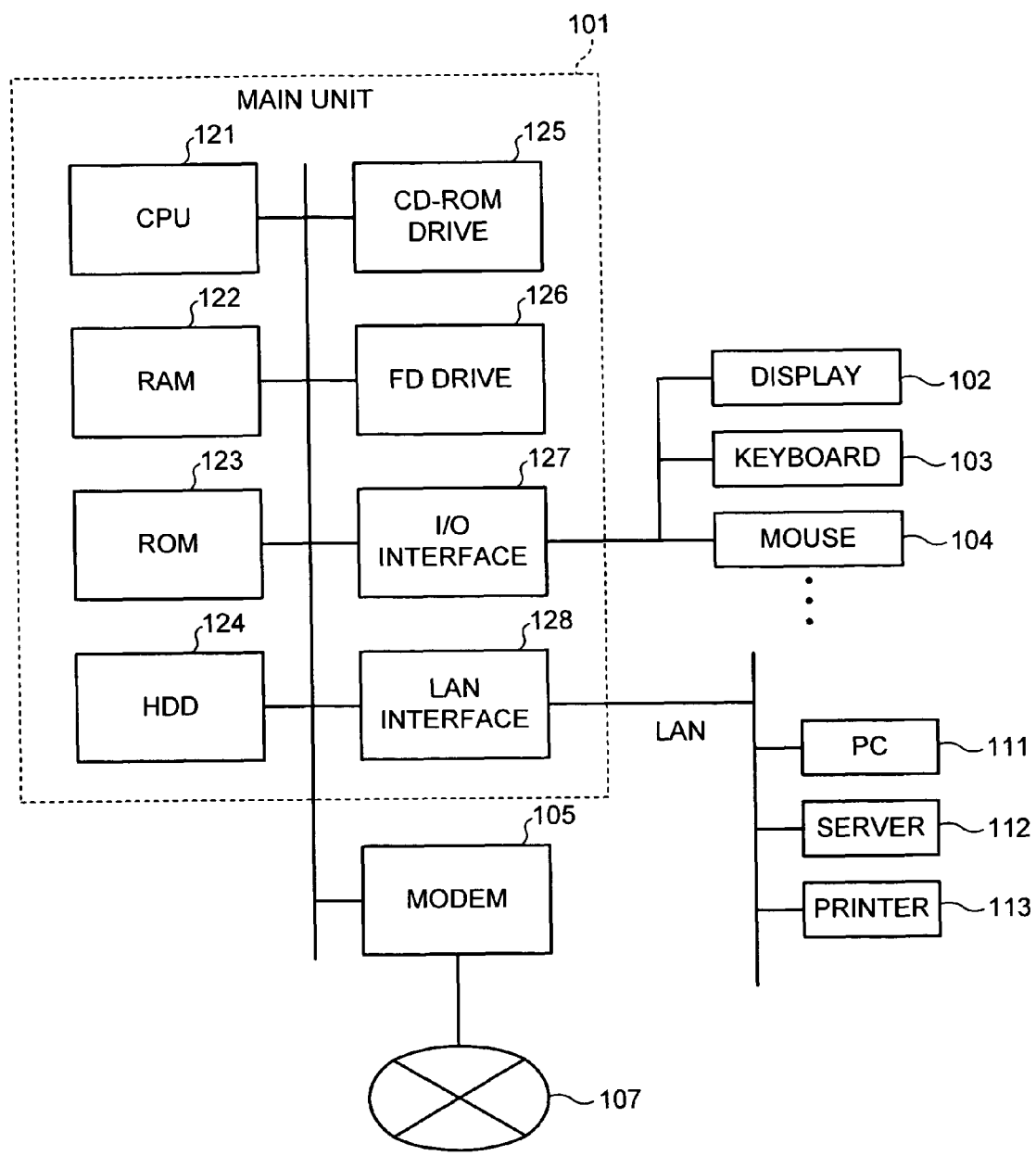
FIG. 15 is a block diagram of a main unit of the computer system shown in FIG. 14.

FIG. 14 is a schematic of a computer system according to another embodiment of the present invention. FIG. 15 is a block diagram of a main unit of the computer system shown in FIG. 14. As shown in FIG. 14, a computer system 100 includes a main unit 101, a display 102 that displays information such as images on a display screen 102a based on instructions from the main unit 101, a keyboard 103 that is used for inputting information into the computer system 100, and a mouse 104 for pointing at any position on the display screen 102a.

The main unit 101 of the computer system 100 includes, as shown in FIG. 15, a central processing unit (CPU) 121, a random access memory (RAM) 122, a read-only memory (ROM) 123, a hard disk drive (HDD) 124, a compact disk-read only memory (CD-ROM) drive 125 that receives a CD-ROM 109, a flexible disk (FD) drive 126 that receives an FD 108, an I/O interface 127 that connects the display 102, the keyboard 103, and the mouse 104, and a LAN interface 128 that connects the computer system 100 to a local area network or a wide area network (LAN/WAN) 106.

The computer system 100 realizes the functions of the present embodiment by loading the program recorded on a specific recording medium. The recording medium may be a "portable" type in the form of FD 108, CD-ROM 109, magneto optic (MO) disk, digital versatile disk (DVD), integrated-circuit (IC) card, etc., or a "fixed" type in the form of HDD 124, RAM 122, ROM 123, etc. integrally provided in the computer system 100, or a "communication medium" in the form of a public circuit 107 connected through a modem 105 or the LAN/WAN 106 by which the computer system 100 is connected to another computer system 111, a server 112, a printer 113, etc. and which stores the transmitted program for a short duration.

In other words, the program is stored in the 'portable' medium, 'fixed' medium or 'communication medium' described above in a readable manner, and the computer system 100 executes these programs by reading the programs stored in the recording medium. Apart from the computer system 100, the programs for providing product information can also be executed by another computer system 111 or the server 112 or together by another computer system 111 and the server 112.

As described above, according to the present invention, by making the user take and pass the test on the software functions that can potentially cause security breach (and not allowing access to the software functions to users whose knowledge regarding such software function is not adequate), vulnerability of the client 10 to attack by a hacker can be prevented, thus ensuring network security.

Since the software functions that are potentially risky are not made available to a novice lacking adequate knowledge about the software functions. Consequently, exposure to attack by hackers and unintentional damage to the computers of other unsuspecting users can be reduced. Further, the software vendor is not at the risk of being held responsible for any security breach that may happen due to a lack of knowledge on the part of the user.

Furthermore, according to the present invention, the access of the software function that is already installed is restricted until the user passes the test relevant to the software function, ruling out a security breach even if the user is a novice.

Moreover, according to the present invention, the software functions that can potentially cause security breach are installed by the client 10 for the first time only after the user passes the test. Consequently, the possibility of the user unwittingly using the software function is eliminated, thus making it safe even for a novice to use the client 10 without jeopardizing the security.

Furthermore, according to the present invention, the software-usage management system allows the transfer, over the network, of only the software function for which the user has passed the test, thus convincingly eliminating the possibility of any breach of security due to the user receiving any irrelevant non-text format data.

Moreover, according to the present invention, the test is conducted by a facility—the test server 20—that is independent from the vendor. If the vendor were to conduct the test, there is a possibility that the test may be made easy to pass so that the vendor benefits. Thus, security is ensured by making the test count.

Furthermore, according to the present invention, by confirming that the software function received from the vendor server 30 is relevant to the test passed by the user, security breach due to the client 10 installing any software function not relevant to the test passed by the user is prevented.

Moreover, according to the present invention, it has been made difficult for a hacker to steal the authentication data, thereby preventing any possibility of the client 10 installing a counterfeit software function. The vendor public encryption key is used for encrypting the 'downloadable software file name' notified by the test server 20 to the vendor server 30.

Furthermore, according to the present invention, by making the user take and pass the test on the software functions that can potentially cause security breach (and not allowing access to the software functions to users whose knowledge regarding such software function is not adequate), vulnerability of the client 10 to attack by a hacker can be prevented, thus ensuring network security.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A software-usage management system comprising:
a processor; and
a memory storing computer-readable instructions, execution of the instructions by the processor facilitating managing a usage of a software function by a client connected to a network, and execution of the instructions by the processor configuring the software-usage management system to include
a test-conducting unit that conducts a test relevant to the software function for a user of the client in which the specific software function is not yet installed from a standpoint of security, wherein the test determines whether the user has a skill of implementing an appropriate security measure to use the specific software function; and
a usage allowing unit that allows the user who passed the test conducted by the test-conducting unit to use the specific software function, by sending actual data of the specific software function to the client after notifying the client that the actual data is to be sent using a text-format data, wherein the client rejects sending and receiving data via the network other than the text-format data, except for receiving the actual data of the specific software function.

2. The software-usage management system according to claim 1, wherein
the test-conducting unit is included in a test server that is connected to the network and managed by a test-conducting agency, and
the usage allowing unit is included in a vendor server that is connected to the network and managed by a vendor.

3. The software-usage management system according to claim 2, wherein
the test-conducting unit sends first identification data indicating the specific software function to the client of the user who passed the test and the vendor,
the usage allowing unit sends second identification data received from the test server and the actual data to the client of the user who passed the test, and
the client compares the first identification data and the second identification data, and if the first identification data is identical to the second identification data, installs the actual data received from the vendor server.

4. The software-usage management system according to claim 3, wherein the first identification data and the second identification data are encrypted in a text-format data, and the client decrypts the first identification data and the second identification data before comparing the first identification data and the second identification data.

5. The software-usage management system according to claim 3, wherein the client of the user who passed the test requests the test-conducting unit to resend the first identification data to the client and the vendor, when the actual data is not correctly received or installed by the client.

6. The software-usage management system according to claim 4, wherein the test-conducting unit and the usage allowing unit use different user public encryption keys to encrypt the first identification data and the second identification data, respectively.

7. A software-usage management method of managing a usage of a software function by a client connected to a network, the software-usage management method comprising:

conducting a test relevant to the software function for a user of the client in which the specific software function is not yet installed from a standpoint of security, wherein the test determines whether the user has a skill of implementing an appropriate security measure to use the specific software function; and allowing a user who passed the test conducted at the conducting to use the specific software function, by sending actual data of the specific software function to the client after notifying the client that the actual data is to be sent using a text-format data, wherein the client rejects sending and receiving data via the network other than the text-format data, except for receiving the actual data of the specific software function.

8. A non-transitory computer-readable recording medium that stores a software-usage management program for managing a usage of a software function by a client connected to a network, wherein the software-usage management program makes a computer execute conducting a test relevant to the software function for a user of the client in which the specific software function is not installed yet from a standpoint of security, wherein the test determines whether the user has a skill of implementing an appropriate security measure to use the specific software function; and allowing a user who passed the test conducted at the conducting to use the specific software function, by sending actual data of the specific software function to the client after notifying the client that the actual data is to be sent using a text-format data, wherein the client rejects sending and receiving data via the network other than the text-format data, except for receiving the actual data of the specific software function.

* * * * *